United States Patent [19]

Schoessow

[11] Patent Number: 4,545,766
[45] Date of Patent: Oct. 8, 1985

[54] TRAINING DEVICE FOR NUCLEAR POWER PLANT OPERATORS

[75] Inventor: Glen J. Schoessow, Gainesville, Fla.

[73] Assignee: PowerSafety International, Inc., Lynchburg, Va.

[21] Appl. No.: 534,322

[22] Filed: Sep. 21, 1983

Related U.S. Application Data

[63] Continuation-in-part of Ser. No. 331,141, Dec. 16, 1981, abandoned.

[51] Int. Cl.⁴ .............................................. G09B 9/00
[52] U.S. Cl. .................................. 434/218; 434/366; 434/370
[58] Field of Search ............... 434/218, 365, 366, 370, 434/389

[56] References Cited

U.S. PATENT DOCUMENTS

| | | | |
|---|---|---|---|
| 3,451,147 | 6/1969 | Mehlig et al. | 434/366 X |
| 4,073,069 | 2/1978 | Basmajian | 434/389 |
| 4,216,593 | 8/1980 | Basmajian et al. | 434/218 |

Primary Examiner—William H. Grieb
Attorney, Agent, or Firm—Arthur G. Yeager; Earl L. Tyner

[57] ABSTRACT

A simulated nuclear energy power plant system with visible internal working components comprising a reactor adapted to contain a liquid with heating elements submerged in the liquid and capable of heating the liquid to an elevated temperature, a steam generator containing water and a heat exchanger means to receive the liquid at an elevated temperature, transform the water to steam, and return the spent liquid to the reactor; a steam turbine receiving high energy steam to drive the turbine and discharging low energy steam to a condenser where the low energy steam is condensed to water which is returned to the steam generator; an electric generator driven by the turbine; indicating means to identify the physical status of the reactor and its contents; and manual and automatic controls to selectively establish normal or abnormal operating conditions in the reactor, steam generator, pressurizer, turbine, electric generator, condenser, and pumps; and to be selectively adjusted to bring the reactor to acceptable operating condition after being placed in an abnormal operation. This device is particularly useful as an education device in demonstrating nuclear reactor operations and in training operating personnel for nuclear reactor systems and also as a device for conducting research on various safety systems to improve the safety of nuclear power plants.

24 Claims, 8 Drawing Figures

TRAINING DEVICE FOR NUCLEAR POWER PLANT OPERATORS

RELATED PATENT APPLICATION

This is a continuation-in-part of my patent application Ser. No. 331,141, filed Dec. 16, 1981, now abandoned.

BACKGROUND OF THE INVENTION

Nuclear reactors, principally for use in generating electricity, have become well known in the past several years. While the underlying nuclear reaction and the apparatus for controlling that reaction are well known to scientists in this field, the thermal-hydraulic behavior of the system is not well known to the operators and a substantial amount of misinformation has resulted from that lack of knowledge. Devices, both large and small, which have been used to simulate nuclear reactors in the past have been designed and built to operate like a programmed computer involving only electrical components and have lacked the flexibility and realism of heated water and steam flowing through plant components needed for such a training device. A computer readout produced by these prior devices is not as impressive as real data produced by a device operating under the scientific laws of nature. There has been a need for an actually operating device employing pumps, valves, temperature measuring devices, flow measuring devices, etc. and functioning with natural responses to various situations, and also being made of transparent materials so as to permit operations of the device and its component parts to be readily observed by the operator in training.

It is an object of this invention to provide an improved means for training power plant operating personnel with respect to the operation of a complete nuclear reactor in an electric generating power plant. It is another object of this invention to provide a device for researching safety systems for such a power plant. It is still another object of this invention to provide a means for demonstrating how abnormal operation of a nuclear power plant might develop and what the consequences might be. Still other objects will appear from the more detailed description of this invention which follows.

BRIEF DESCRIPTION OF THIS INVENTION

This invention provides a nuclear power plant training system where all components are real (except for heaters simulating nuclear fuel) with circulating water and steam operating under the scientific laws of nature, thereby providing true operational behavior in constrast to previous training simulators made of electrical circuits providing only the operating results the designer has programmed into the circuits, and also in contrast to a few incomplete devices that represent only a small portion of a complete nuclear plant system.

This invention involves a simulated nuclear power plant system comprising (a) a reactor containing a liquid, heating elements immersible in the liquid and capable of heating the liquid to elevated temperatures, and piping and pumping means to transport the liquid in a closed circuit from the reactor to a steam generator and return to the reactor;

(b) a steam generator comprising a vessel containing water, heat exchanger tubes submerged in the water with high temperature liquid from the reactor passing through the heat exchanger tubes and heating the water to its vaporization temperature, and piping and pumping means to transport steam from the generator to a turbine;

(c) a steam turbine receiving high energy steam and discharging low energy steam, and piping and pumping means to transport the low energy steam to a condenser;

(d) an electric generator operatively connected to the turbine so as to generate electricity as the turbine rotates;

(e) a condenser to receive low energy steam from the turbine, condense the steam to water, piping and pumping means to return the water to the steam generator;

(f) means to monitor the temperature and pressure of the liquid in the reactor and the proportion of the heating elements submerged in water;

(g) visible indicating means to identify the physical status of the reactor in any of a variety of selected modes normal and abnormal operation; and (h) piping, valving and pumping means to provide manual controls and electric controls to produce any of a variety of selected modes of operation, both normal and abnormal, of the reactor, and to accomplish an acceptable corrective response to an abnormal operation of the reactor.

In a specific embodiment of this invention the reactor produces liquid water under pressure at a temperature above its atmospheric boiling point or it produces steam. In another specific embodiment of this invention the reactor is set to function in any of a variety of abnormal operations and corrective controls are available to be manually operated to bring the abnormal operation into an acceptable corrected status.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
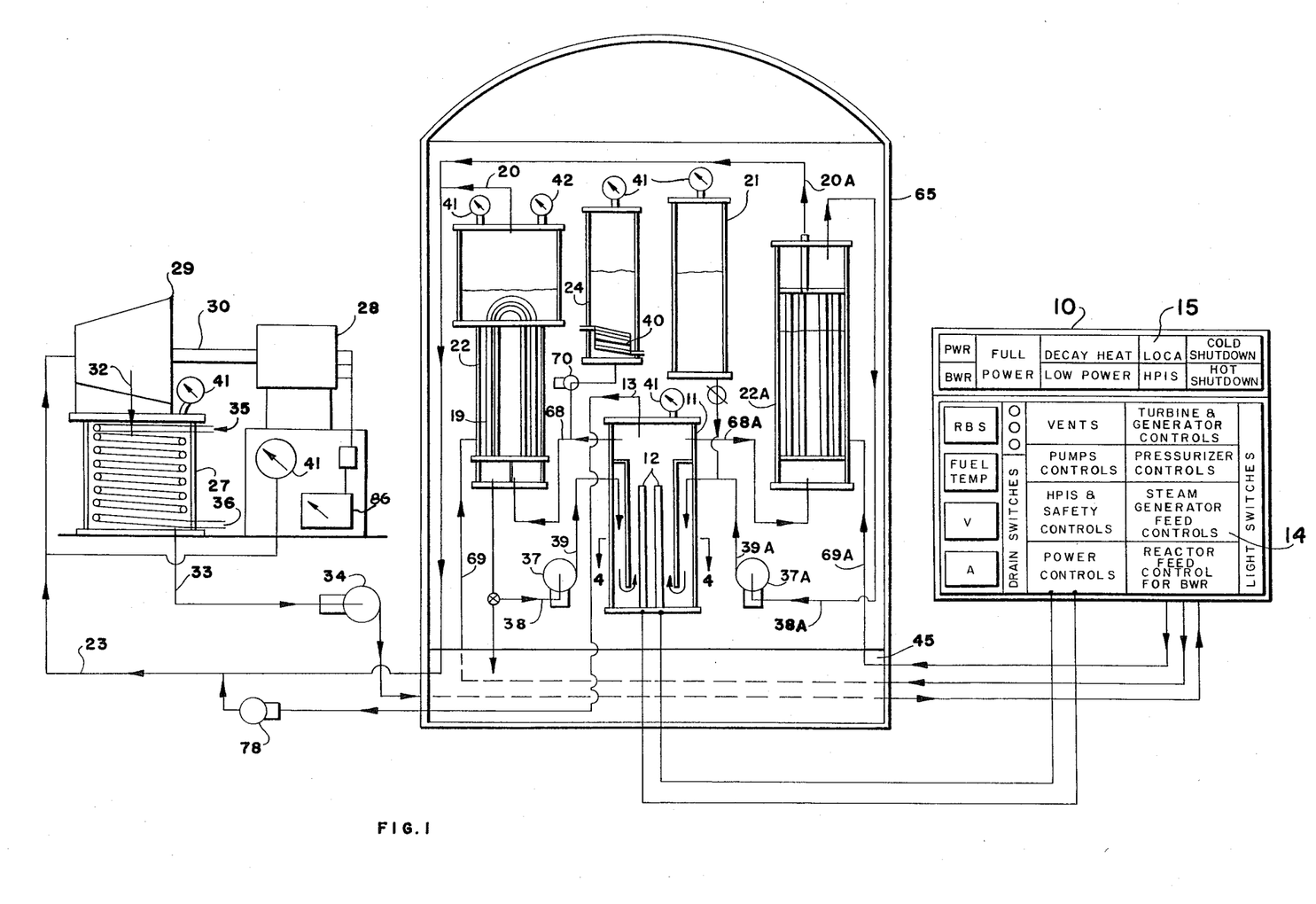
FIG. 1 is a schematic flow diagram of the system of this invention.

In the flow diagram of FIG. 1 there is shown the system of this invention. Reactor 11 is designed to simulate a nuclear reactor that produces a large amount of heat absorbed by a fluid which is then conducted to another location to recover that heat. In this instance the reactor 11 is a glass cylinder containing a plurality of electrical resistance heaters 12 submerged in water in reactor 11. Heaters 12 are capable of heating the water to any desirable temperature, preferably from about 75° to about 300° F. The temperature of heaters 12 is recorded continously on a recorder which may be any of several types available commercially today. A preferred reactor of this system might have seven heaters 12 arranged in a spaced design with one being centrally located and six being equally spaced around the central heater.

The system is monitored by recording the temperatures of thermocouples 16 placed along the surface of the central heater in a suitable arrangement for example, thermocouples 16 might be spaced at different radial locations on the surface of the central heater and also spaced at different locations along the axial length of that heater. The recorder preferably records the temperatures sensed by each of thermocouples 16.

The outlet from reactor 11 contains a high heat energy fluid, which in different embodiments of this invention may be pressurized water or steam. If the fluid is pressurized water, it will be fed through lines 68 or 68A into the internal tubes 19 or 19A of steam generator 22 or 22A, respectively, to transfer its heat to water in generator 22 or 22A, that will, in turn be transformed into steam and exit through line 20 or 20A to enter turbine 29. Steam generator 22 is a U-tube device and steam generator 22A is a straight tube device, which are each capable of producing the necessary steam for turbine 29. If the fluid produced in reactor 11 is steam it will be conducted from line 13 through valve 78 to line 23 and then directly into turbine 29. If reactor 11 is operating on the pressurized water system, valve 78 will be closed. Steam generators 22 and 22A are preferably made with glass walls so that the interior working of this component may be seen. Similarly it is preferable to have turbine 29 in a transparent housing so that the operation of the steam in driving the turbine may be viewed.

The passage of the steam through turbine 29 transforms the heat energy of the steam into kinetic energy, exemplified by the rotation of shaft 30. One of the preferred methods of employing the kinetic energy of shaft 30 is to employ it to drive electric generator 28 to produce power which may be conducted through suitable terminals and leads to any desired ultimate use. Ammeter 86 indicates the output amperage of generator 28 to show the amount of power produced. The high heat energy steam entering turbine 29 leaves through line 32 as low energy steam and enters condenser 27 which transforms that fluid into water and returns it through line 33 and pump 34 to control panel 10 and back to steam generators 22 or 22A through lines 69 or 69A. Condenser 27 is cooled by low temperature water flowing in at line 35 and leaving through line 36 with heat absorbed from the steam entering through line 32. The water leaving through line 36 may be employed for any other useful purpose in the system or may be drained to a waste disposal line. Condenser 27 is preferably glass enclosed vessel so as to make its operations visible from the outside.

The high energy fluid entering steam generator 22 or 22A through line 68 or 68A is transformed into a low energy fluid in passing through a generator 22 or 22A and exits through line 38 or 38A and pump 37 or 37A to be recycled back into reactor 11 through line 39 or 39A respectively. When the system is operating to produce pressurized water, pressurizer 24 is employed and this is a vessel containing water heated by coil 40 (which may be electrical or any other heating source) so as to produce steam pressure above the level of water in pressurizer 27. This pressure will, of course, transmit itself throughout the system, and if maintained at the proper level, will prevent the water in reactor 11 from vaporizing. If reactor 11 is permitted to produce steam, pressurizer 24 is not employed and valve 70 is closed. Flood tank 21 is a storage supply of water to be employed in maintaining the proper amount of water in the entire system in the case of an abnormal operation involving a leak in the system. Suitable pressure gauges 41 are shown at various locations to show visibly the condition of the pressure in that location. Temperature gauges 42 may also be employed at various locations to monitor the temperature at that location. Reactor 11, steam generators 22 and 22A, pressurizer 24, flood tank 21, and associated pumps, valves, and lines are all placed within a safety containment 65 designed to contain leaks, explosions, etc. from harming operators or other persons in the vicinity.

In order to provide a visible display, control panel 10 is placed at a single location to include lighted panels indicating various operating conditions, suitable valves, gauges, temperature dials, control switches, and lines employed to control the flow of fluids in the system. Display panel 15 is designed to show the status of the system at any one time by means of a plurality of display signs which light up individually to indicate different conditions under which this system is operated. For example, if the system is operating at full power the sign indicating "Full Power" is lighted so as to be visible from the front. Similarly, "Low Power" indicates a low power operation. Other sections of panel 15 may identify different abnormal operations. "LOCA" means loss of coolant accident and is intended to indicate that a leak has occurred in the system requiring corrective action, manually or automatically, to add coolant (water in this system) to maintain the proper level in the reactor. "HPIS" means high pressure injection system and indicates that because of a leak in the system coolant water is being injected under high pressure into the system. "PWR" means the pressurized water reactor is operating. "BWR" means the boiling water reactor is operating. "DECAY HEAT" means the system is not producing power but heat is still being generated as the system cools down. "COLD SHUTDOWN" and "HOT SHUTDOWN" means that the system is shutdown while hot or cold. These panel sections indicate the various modes of operation which may be employed to demonstrate how the nuclear reactor core operates normally and how it is protected from damage because of leaks or other abnormal operations.

Operating panel 14 contains a plurality of switches and timing devices which operate various solenoid valves at various locations in the system. Panels 14 and 15 provide the operator with an opportunity to learn how the operation of a particular valve, switch or timing device will change the operation of the power plant, perhaps from an abnormal condition to a normal condition.

Figure 2:
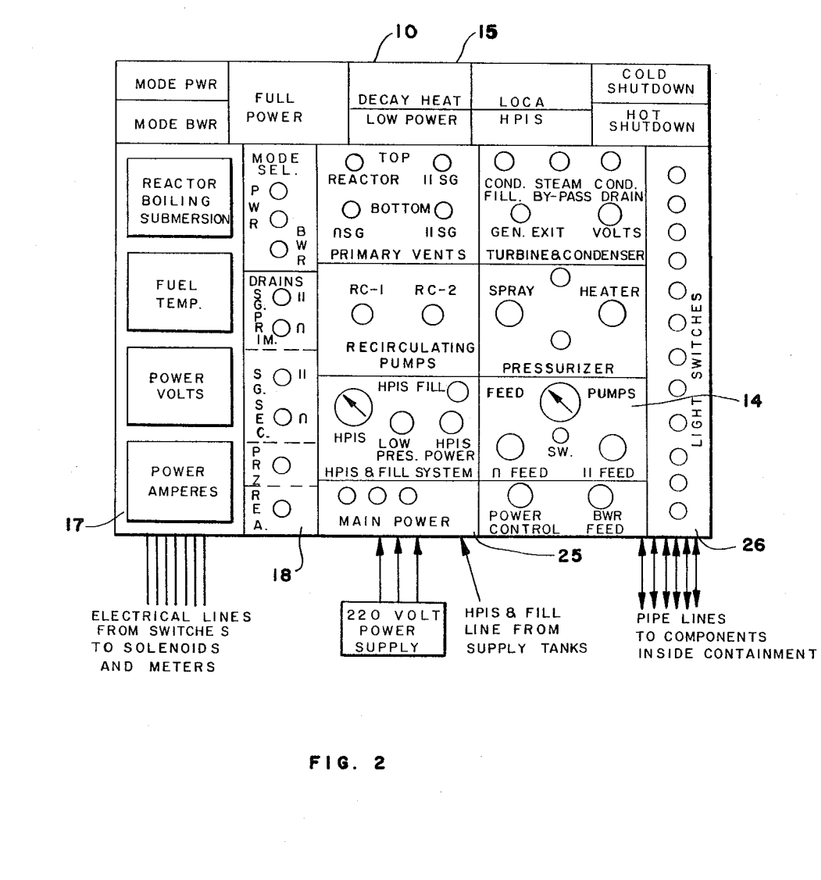
FIG. 2 is a diagram of the control panel of the device to this system.

FIG. 2 shows an enlarged view of control panel 10, including display panel 15 and operating panel 14. In section 17 there are gauges to indicate the proportion of the reactor heaters that are submerged in water, temperature of fuel (heaters in this case) and power output in volts and amps. In section 18 there are switches to select the type of system employed, i.e., boiling water or pressurized water; and for operating various drainage valves in the reactor, steam generators, and pressurizer. In section 25 there are various switches and gauges for operating vents, pump, turbine, condenser, pressurizer, HPIS (high pressurized injection system), and main power. In section 26 are various light switches employed in panel 10 and other locations to illuminate the training device.

Figure 3:
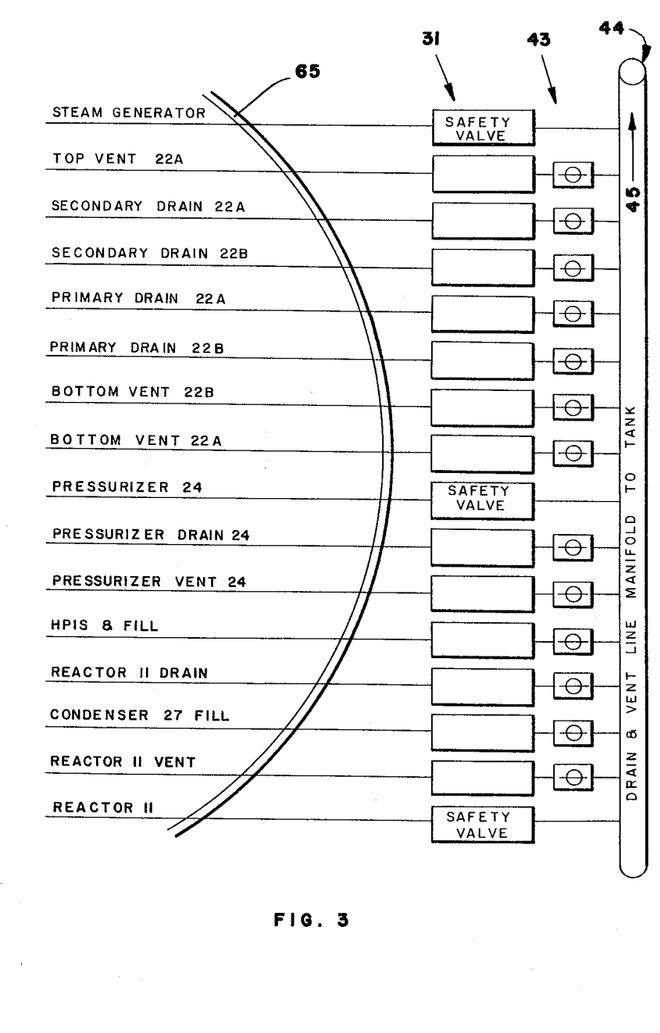
FIG. 3 is a schematic diagram of the operating valves controlling various components of this system.

FIG. 3 shows and identifies various valves used to operate the equipment inside safety containment 65. The valves aligned under 31 are solenoid valves except for three indicated safety valves that are manually controlled. The valves under 43 are manually operated valves. Line 44 is a manifold connected to the various valves and to a supply tank 45 described with respect to FIG. 8.

Figures 4, 5:
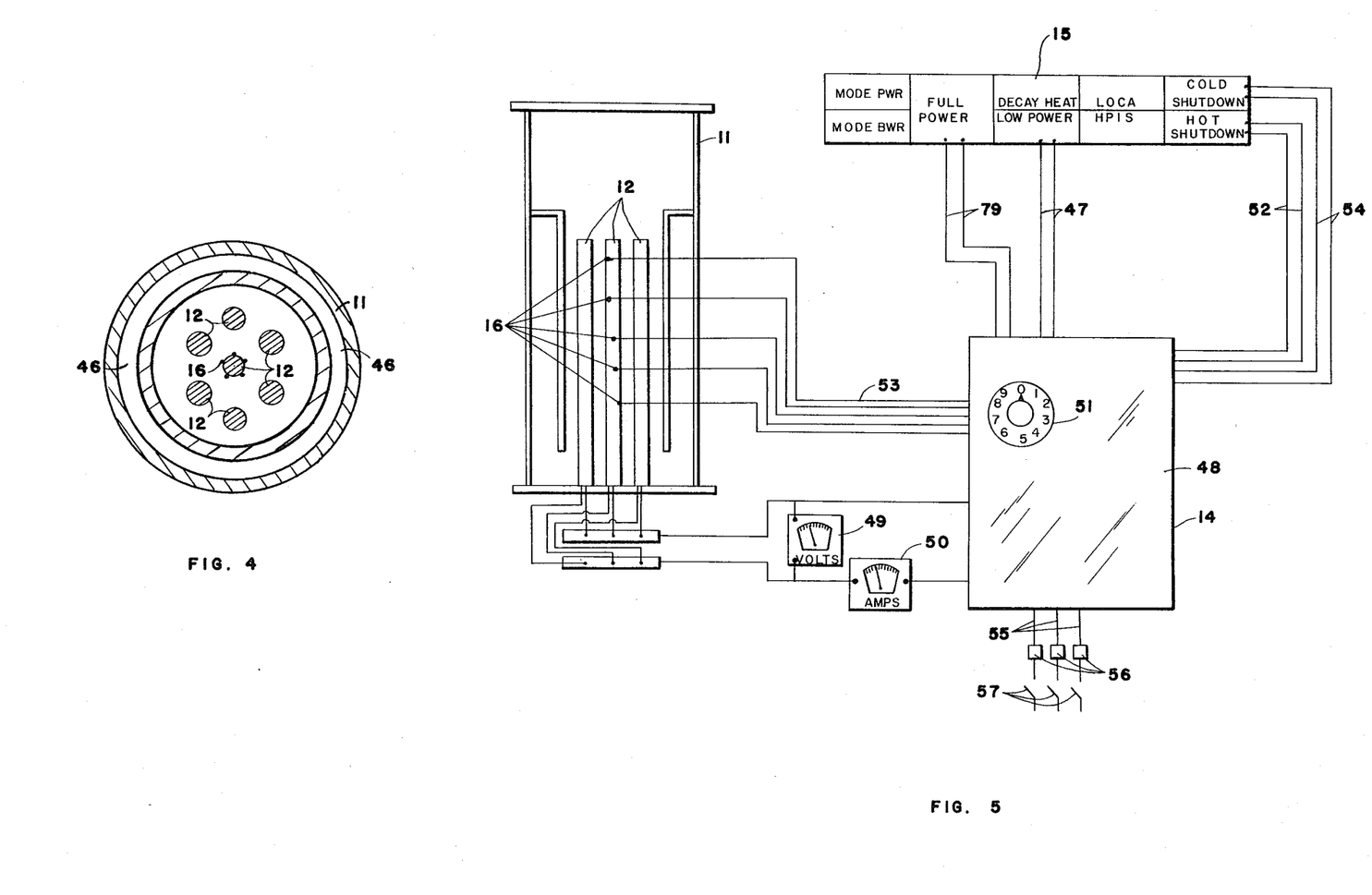
FIG. 4 is a cross sectional view taken at 4—4 of FIG. 1.
FIG. 5 is a schematic diagram of the electrical circuitry of the power controls of the reactor.

FIG. 4 is a cross-sectional view of reactor 11 taken at 4—4 of FIG. 1. There is shown an arrangement of seven heaters 12 with the central heater having attached thereto thermocouples 16 in spaced (both radially and longitudinally) relationship. Entrance annulus 46 directs the feed water downwardly as may be seen in FIG. 1.

In FIG. 5 there is shown the principal electrical connections controlling power to reactor 11. Lines 47 and 79 connect power controls 48 (a portion of section 25 in FIG. 2) and to the appropriate portions of display panel 15. Voltmeter 49 and ammeter 50 (located on operating panel 14 of FIG. 2) indicate the power input to heaters 12 in reactor 11. The power input is controlled by a potentiometer mounted on operating panel 14 with control knob 51 available for operating control. Power preferably is 220 volts A.C. and the potentiometer merely eliminates part of the power sine wave and thereby regulates power input. Lines 52 operate through temperature relays to shutdown the power when the temperature of the thermocouples is shown to be too high as signalled through lines 53. Lines 54 operate through signals from thermocouples through lines 53 to shutdown the reactor when it is too cold. Lines 55, circuit breakers 56, and switches 57, are the main input power lines and their associated equipment to control main power input to control panel 10.

Figure 6:
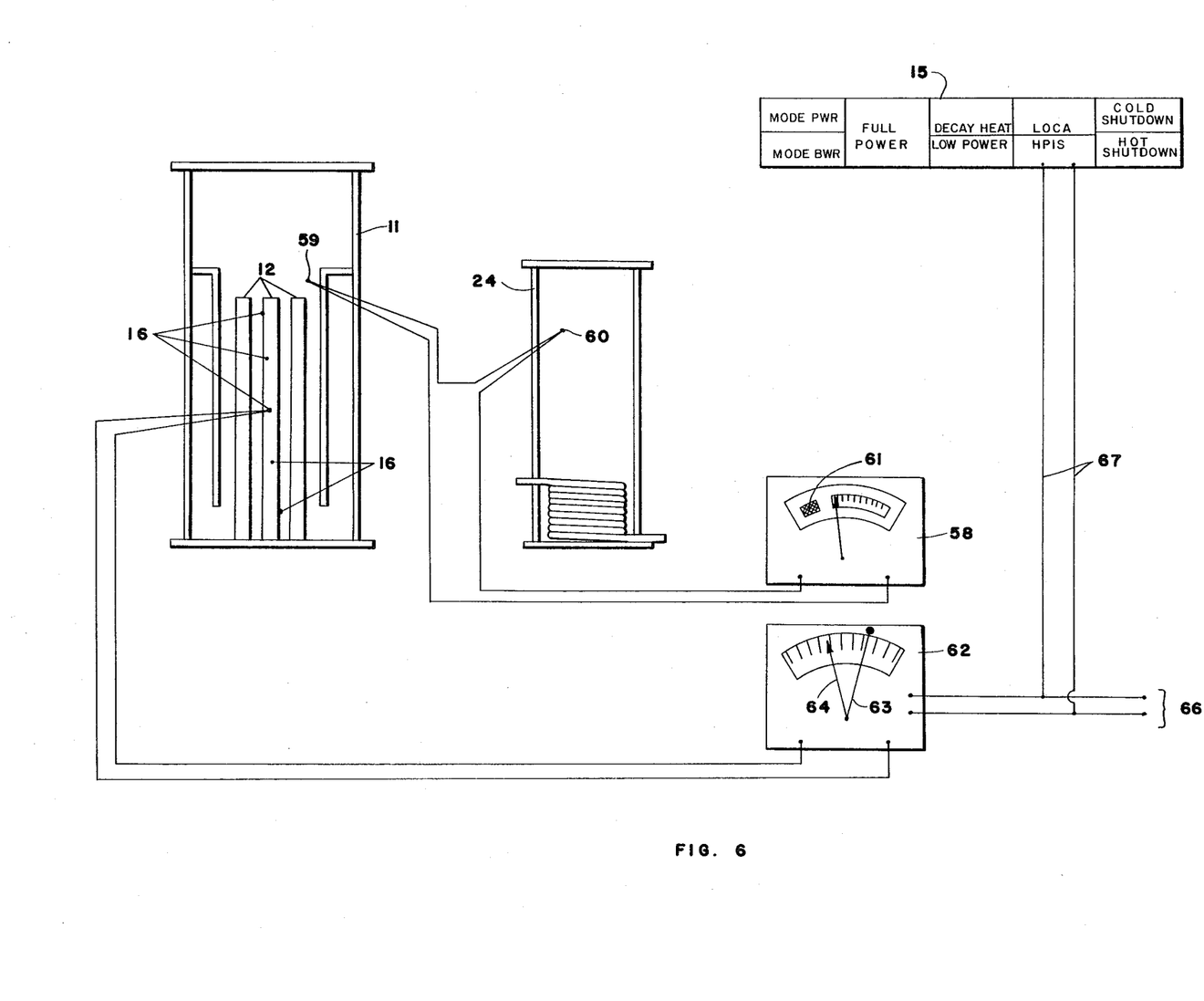
FIG. 6 is a schematic diagram of the temperature controls of the reactor and pressurizer.

In FIG. 6 there are shown some of the electrical circuits controlling reactor 11 and pressurizer 24. Gauge 58 (located on operating panel 14) indicates safe or unsafe operation of reactor 11 and pressurizer 24 because of sufficient or insufficient water in each piece of equipment. If there is insufficient water thermocouples 59 or 60 are exposed and the gauge shows unsafe operation when the needle points to region 61.

Gauge 62 (also on operating panel 14) monitors the temperature of a selected thermocouple 16 on heater 12 in reactor 11, simulating the monitoring of fuel temperature in a nuclear reactor. Gauge 62 has a manually adjustable contact bar 63. If needle 64 moves high enough to contact bar 63, a signal is sent to operate the HPIS equipment through lines 66 and to turn on the HPIS indicator on display panel 15 through lines 67. HPIS equipment then causes injection of water into reactor 11 or pressurizer 24 to bring the water level to the proper elevation.

Figure 7:
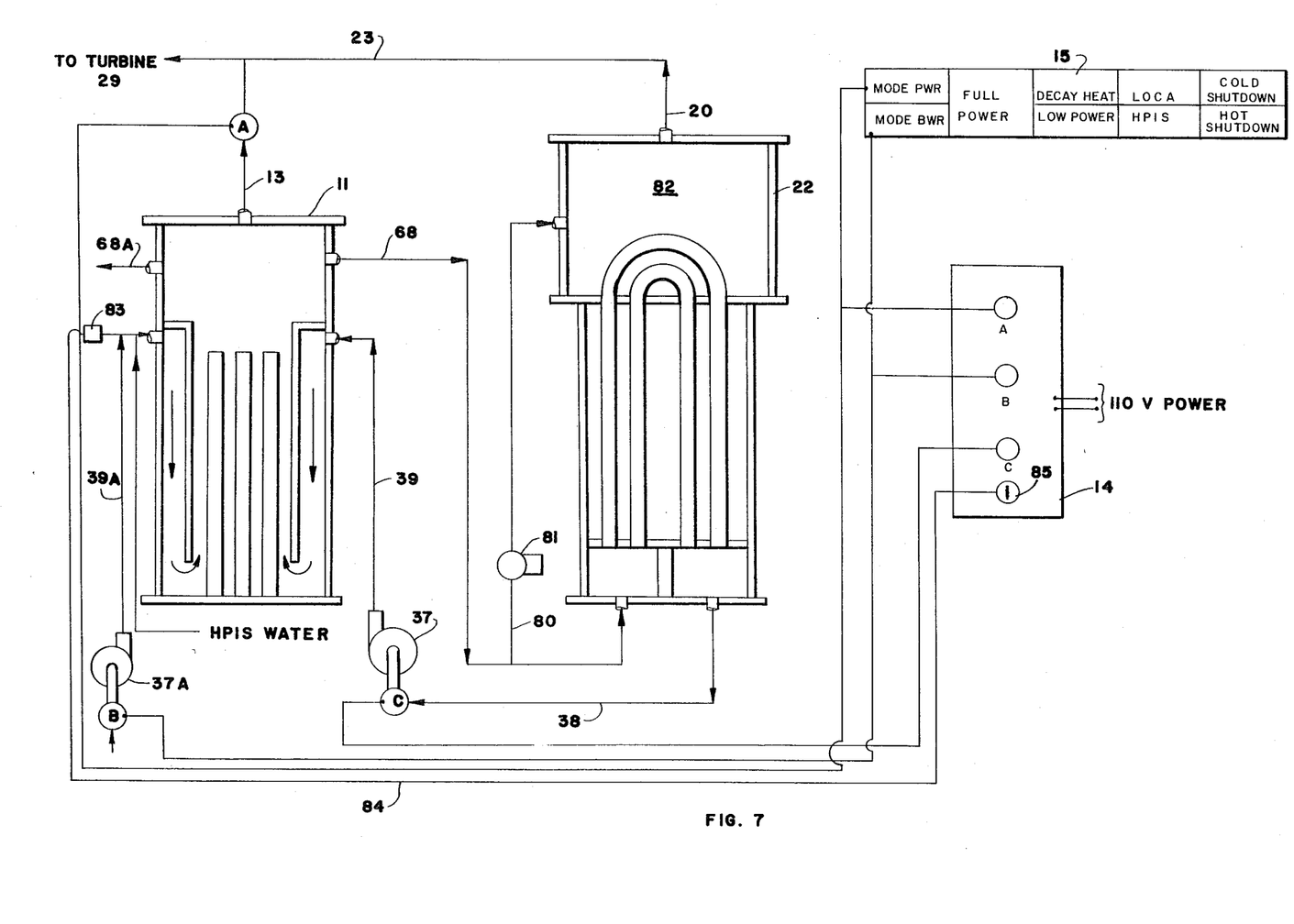
FIG. 7 is a schematic diagram of the electric circuitry in the power controls for the pressurized water system and the boiling water system.

In FIG. 7 there is shown the control system for selecting the mode of operation of reactor 11. Steam generator 22 (U-tube type) is shown with its connections to reactor 11. Steam generator 22A (straight tube type) is not shown but it actually is connected to reactor 11 in the same fashion as shown with respect to generator 22. The inlet and outlet water and steam lines connecting reactor 11, steam generator 22 and pump 37 are indicated by the same reference numbers as in FIG. 1. Three solenoid valves, A, B and C, are operated by control switches on panel 14 to select the mode of operation, i.e., PWR, pressurized water reactor, or BWR, boiling water reactor. Switches A, B and C on panel 14 are connected electrically to valves A, B and C respectively. When reactor 11 is operated on PWR, valve A is closed and valves B and C are open. Conversely, when reactor is operated on BWR, valve A is open and valves B and C are closed. The appropriate portions of display panel 15 are lighted up to indicate which mode, PWR, or BWR, is in operation.

Figure 8:
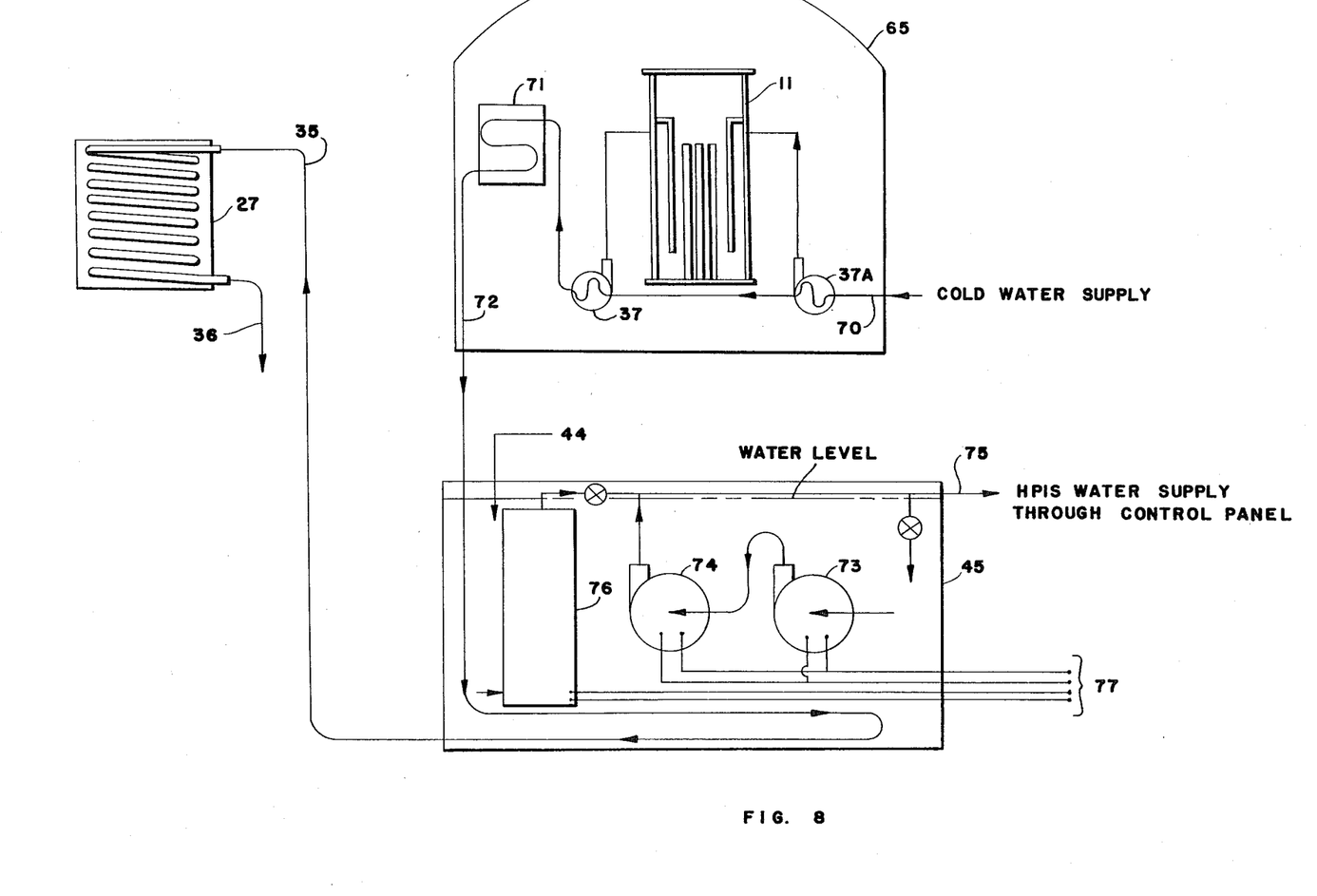
FIG. 8 is a schematic diagram of the cooling water system, drainage system, and water supply tank.

FIG. 8 shows the cooling water system, drainage lines, and water supply tank. Safety containment 65 is shown with reactor 11 and pumps 37 and 37A. Other equipment in containment 65 as described above with respect to FIG. 1 has been omitted from FIG. 8 for the sake of simplicity. Pumps 37 and 37A must be cooled to provide efficient operation and a commercial or natural cold water supply is connected to these pumps thorugh line 70 to circulate through pumps 37 and 37A and thence to air conditioner 71 which maintains the proper atmospheric conditions within safety containment 16. Water leaving air conditioner 71 passes through line 72 to main water supply tank 45 where it exchanges heat with the water in tank 45 and then passes through line 35 to be the heat transfer medium in condenser 27 to condense steam leaving the turbine. Water leaving condenser through line 36 may be cooled for recirculation or it may be discharged as waste. Tank 45 is substantially filled with water to serve as the supply for HPIS system. Two pumps 73 and 74 are connected in series to furnish the high pressure water needed for the HPIS system which is carried through line 75 to whichever piece of equipment the operator should select. An ion exchange column 76 is shown for treating the water in tank 45 to provide soft water as needed. Water drained from any of the equipment in containment 65 is collected in header 44 (see FIG. 3) and emptied in tank 45. Power leads 77 connect appropriate switches on operating panel 14 with pumps 73 and 74 and ion exchange column 76.

It is of particular importance that the system of this invention be adapted to demonstrate abnormal operation of a nuclear reactor. For example, one of the types of demonstrations which can be readily shown by this system involves the interruption of line 38 through which water is normally recycled into reactor 11. By suitable operation of the valves and controls of this system the flow in line 39 may be changed to cause water from reactor 11 to be conducted into drain tank 45 simulating a break in the primary coolant system of a nuclear reactor. After a specified time period, which may be preset for any number of seconds up to about 60 by operation of switches in panel 14 the drain line may be closed and the "HPIS" system initiated whereby coolant is admitted to the reactor 11 at a specified rate set by an appropriate manually controlled valve. In still another abnormal operation the "core flood" system can be employed to work independently and be preset by a switch in panel 14 to initiate a flooding of the core of the reactor in any number of seconds up to about 40. Certain ones of the various manual control valves may also be set by hand to allow a variation in the drain rate and thereby simulate different blowdown rates associated with various losses of coolant. Various safety systems can also be demonstrated by this system including high or low pressure injection systems.

Another abnormal operation relates to a failure of a tube 19 or 19A of steam generator 22 or 22A, respectively, when operating with pressurized water. Tube failure permits hot, pressurized water to flow into the space wherein steam is being generated. The result is a sudden rise in steam pressure in line 20 or 20A and a drop in pressure in reactor 11 and in line 68 or 68A. This type of failure occurs in full scale nuclear plants and the operator needs to know how to recognize the problem and what to do about it. In the device of this invention such a failure is simulated by introducing hot, pressurized water from line 68 (FIG. 7) through line 80 when solenoid operated valve 81 is opened admitting the water to steam space 82 in generator 22. The same type of arrangement is also available for steam generator 22A, if desired. Normally valve 81 is closed, but it can be opened by operation of a switch on panel 14.

Still another abnormal operation that is demonstrable with this system is one in which pressurizer 24 fails or is removed from the system for any reason. This type of operation is simulated by closing valve 70 (FIG. 1). An appropriate correction to cope with the removal of pressurizer 24 from the system is to open the valve identified as HPIS and Fill (FIG. 3) and to turn on HPIS pumps 73 and 74 (FIG. 8). Pumps 73 and 74 are centrifugal pumps with the characteristic of providing a maximum head equal to the operating pressure in reactor 11, e.g. 30 psia. With pumps 73 and 74 on the pressure in reactor 11 will be the pressure delivered by pumps 73 and 74; in the example given above that pressure will be 30 psia. When that pressure is reached no water will be flowing through the pumps, they will be maintaining the pressure but not pumping water. If a simulated leak should be imposed on this system causing the pressure to fall, the pumps will deliver a flow of water to bring the pressure back to a value very close to 30 psia. If for any reason the pressure in the system should increase to above 30 psia, water will flow backwards through pumps 73 and 74 into supply tank 45 until the pressure is reduced to 30 psia.

A safety control which this system demonstrates is one wherein the system may develop a leak and it may be desirable to operate at less than full pressure in order to reduce the amount of leakage, which, for example, might otherwise cause flooding of a building or damage equipment. In the present system a leak will be detected and the HPIS water system will come on to keep the equipment full of water. In order to control the HPIS system an electric switch 83 (FIG. 7) may be installed which turns HPIS water on or off, depending on the pressure sensed by switch 83, which is adjustable to switch on or off at selected pressures. For example, switch 83 may be set to switch on at 50% of the normal system pressure and switch off at 75% of the normal system pressure. The HPIS water injection would therefore be cycled on and off to maintain pressure between these two valves so as to keep the system operating and yet lose less water through the leak than would otherwise be the case. Switch 83 is connected by line 84 to key control switch 85 in panel 14. Switch 85 is operated by a key which permits the switch to be set and cannot be changed without use of a removable key. This would insure that a plant operator would not be able to change to switch setting without obtaining a supervisor's approval, if the supervisor carries the key. Switch 85 could be turned off when starting up the reactor under full pressure, and then switch 85 would be turned on so as to allow switch 83 to function automatically in the event of a leak or other reason for a drop in pressure.

While the invention has been described with respect to certain specific embodiments, it will be appreciated that many modifications and changes may be made by those skilled in the art without departing from the spirit of the invention. It is intended, thereby the appended claims to cover all such modifications and changes as fall within the true spirit and scope of the invention.

What is claimed as new and what is desired to secure by Letters Patent of the United States is:

1. In a training device for nuclear power plant operators including
   (a) a reactor containing a liquid, heating element immersible in the liquid and capable of heating the liquid to elevated temperatures, and piping and pumping means to transport the liquid in a closed circuit from the reactor to a steam generator and return to the reactor;
   (b) a steam generator comprising a vessel containing water, heat exchange tubes submerged in the water with high temperature liquid from the reactor passing through the heat exchanger tubes and heating the water to its vaporization temperature, and piping and pumping means to transport steam from the generator to a turbine;
   (c) a steam turbine receiving high energy steam and discharging lower energy steam, and piping and pumping means to transport the lower energy steam to a condenser;
   (d) an electric generator operatively connected to the turbine so as to generate electricity as the turbine rotates;
   (e) a condenser to receive low energy steam from the turbine, condense the steam to water, and piping and pumping means to return the water to the steam generator; and
   (f) means to monitor the temperature and pressure of the liquid in the reactor and the proportion of the heating elements submerged in water;

the improvement comprising
   (1) visible indicating means to identify the physical status of the power plant in any of a variety of selected modes of normal and abnormal operation; and
   (2) piping, valving, and pumping means to provide manual controls and electrical controls assembled in a central location to produce any of a variety of selected modes of operation, both normal and abnormal, of the power plant, and to accomplish an acceptable corrective response to an abnormal operation of the power plant.

2. The system of claim 1 wherein the liquid is water.

3. The system of claim 1 wherein the liquid is water under sufficient pressure that it does not vaporize at any time during its travel from the reactor to the steam generator and back to the reactor.

4. The system of claim 1 wherein the improvement additionally comprises gauge means to indicate insufficient liquid in said reactor to submerge all of said heating elements.

5. The system of claim 1 wherein the visible indicating means includes lightable panels, each of which includes an identifying code relating to a physical status of the power plant, the appropriate panel being lighted when the respective status is present.

6. The system of claim 4 wherein the improvement includes means to flood the reactor rapidly with additional liquid to submerge all of said heating elements.

7. The system of claim 1 wherein the improvement additionally comprises a source of water, separate from any water in the operating portions of the system, this separate source of water being operatively connected by suitable piping, valving, and pumping means to the system, so as to flood the reactor when appropriate valves, pumps, or other control means are set to accomplish that purpose.

8. The system of claim 1 wherein the reactor, the steam generator, the turbine, the electrical generator, and the condenser are constructed, wholly or partly, of transparent materials so as to make internal working parts and the course of water and steam visible to an observer of the system.

9. The system of claim 1 wherein the improvement includes means for manually setting the power plant to operate in any of several selected abnormal modes, and the abnormal modes can be subsequently changed to normal modes by manually operating appropriate control valves and other control means.

10. The system of claim 1 which includes a safety containment barrier enclosing the reactor, the steam generator, and any other potentially dangerous equipment and separating such equipment from the operator trainee and yet maintaining it visible to the operator trainee.

11. The system of claim 1 which includes temperature sensing devices in the reactor to sense the temperature of the liquid at different vertical levels in the reactor.

12. The system of claim 1 which includes means for selectively introducing hot water under superatmospheric pressure into said steam generator in the zone wherein water is being vaporized to steam.

13. The system of claim 3 which includes a closed vessel containing water and a means for heating the water in that vessel to a sufficiently high temperature to cause the water in the system to be at superatmospheric pressure.

14. The system of claim 13 which includes valve means to close the connection between the vessel and the remainder of the system, and pump means connected to said system and to a separate source of water so as to maintain substantial operating pressure on the system.

15. The system of claim 7 which includes a pressure switch in the inlet to said reactor with selective high and low pressure settings whereby water from said separate source is pumped when the pressure in the reactor inlet is between said high and low settings and water is not pumped when the pressure is equal to or greater than said high pressure setting.

16. The system of claim 15 wherein said pressure switch is controlled by an electric power switch operated with a removalbe key.

17. In a self-contained training device simulating a nuclear power plant including:
(a) a safety containment enclosing a reactor, at least one steam generator, a pressurizer, and associated water circulation pumps, conduits, and remotely controlled valves;
(b) said reactor being a vessel containing water and electrical heating elements immersed in said water with suitable thermocouples to monitor the temperature of the water and the proportion of heating element immersed in water;
(c) said steam generator being a shell and tube heat exchanger containing water exterior to tubes and providing access and egress inside tubes to hot water or steam pumped thereinto from said reactor;
(d) suitable pumps, valves, and conduits to operatively connect the reactor to the steam generator, to deliver feed water to the reactor and steam generator, and to remove steam from the reactor or the steam generator to outside the safety containment; and
(e) a steam turbine adapted to receive steam from the reactor or the steam generator, and connected to an electric generator so as to produce electricity as the turbine rotates, and a condenser to receive steam exiting the turbine and converting that steam to water for recycling to said steam generator;

the improvement comprising
(1) a water supply tank into which water may be drained from any or all equipment mentioned above, and from which water may be drawn for any use elsewhere in this device;
(2) means for withdrawing water from said supply tank and rapidly pumping it into the reactor to flood the interior components;
(3) means for producing any of a plurality of modes of normal and abnormal operation of the device or any of its component equipment; and
(4) a centrally located, illuminated control panel including monitoring gauges for indicating temperatures and pressures of water and steam at various locations in the device, monitoring gauges for indicating electric power components used in the reactor or generated by the electric generator, electrical switches and timing devices for operating selected pumps and valves, and illuminated panels for indicating any of several selected modes of normal and abnormal operation of the device or any of its component equipment.

18. The device of claim 17 which includes within said safety containment a pressurizer vessel partially filled with water and adapted to be heated so as to pressurize the water leaving the reactor and maintain it in liquid form at temperatures above the boiling point of water.

19. The device of claim 17 which includes means to simulate a leak in the coolant system of the reactor.

20. The device of claim 17 which includes a plurality of thermocouples firmly in contact with said heating elements and spaced at different vertical locations representing possible water levels in said reactor.

21. The system of claim 17 wherein said steam generator includes means for selectively introducing water under superatmospheric pressure into the space outside said heat exchanger tubes.

22. The system of claim 17 which includes means to pump water from said supply tank into said reactor to maintain substantial operating pressure on the water in said reactor when said pressurizer is not operably connected to the system.

23. The system of claim 17 which includes a means for sensing the pressure on water in the reactor and a means for pumping water from said supply tank into the reactor when said pressure sensing means senses a pressure at least as low as a selected low setting and does not permit such pumping when the pressure sensing means senses a pressure at least as high as a selected high setting.

24. The system of claim 23 wherein said pressure sensing means is made operable or inoperable by a switch controlled by a removable key.

* * * * *